United States Patent [19]

Noda et al.

[11] Patent Number: 5,780,532
[45] Date of Patent: Jul. 14, 1998

[54] AQUEOUS COATING OF CARBOXYL ACRYLIC RESIN-EPOXY RESIN PRODUCT

[75] Inventors: Sumio Noda; Seiji Takami; Haruo Inoue; Kaoru Morita, all of Hiratsuka, Japan

[73] Assignee: Kansai Paint Co., Limited, Hyogo-ken, Japan

[21] Appl. No.: 693,706

[22] Filed: Aug. 7, 1996

[30] Foreign Application Priority Data

Sep. 18, 1995 [JP] Japan ................. 7-238218

[51] Int. Cl.$^6$ .............. C08K 5/04; C08L 33/02; C08L 63/02
[52] U.S. Cl. ............... 523/412; 523/409; 523/411
[58] Field of Search ................. 523/409, 412, 523/411

[56] References Cited

U.S. PATENT DOCUMENTS

| | | | |
|---|---|---|---|
| 4,247,439 | 1/1981 | Matthews et al. | 523/412 |
| 4,458,040 | 7/1984 | Suzuki et al. | 523/412 |
| 4,897,434 | 1/1990 | Shimada et al. | 523/412 |
| 5,264,469 | 11/1993 | Mysliwczyk et al. | 523/412 |

*Primary Examiner*—Robert E. Sellers
*Attorney, Agent, or Firm*—Armstrong, Westerman, Hattori, McLeland & Naughton

[57] ABSTRACT

An aqueous coating composition comprising a carboxyl-containing reaction product neutralized and dispersed in an aqueous medium, the reaction product being produced by the esterification reaction of a carboxyl-containing acrylic resin (A) and an epoxy resin (B), the acrylic resin (A) comprising a carboxyl-containing polymerizable unsaturated monomer (A) and another polymerizable unsaturated monomer (b) as a monomer component, the acid value of the acrylic resin (A) at a higher molecular weight region with respect to its weight average molecular weight being higher by at least 80 mg KOH/g than at a lower molecular weight region, and a process for preparing said aqueous coating composition. The coating composition is capable of forming a coating film excellent in fabrication property, corrosion resistance, water resistance, flavor-retaining ability, among others. As a consequence, even a thin film of the composition is uniform in thickness and is outstanding in resistance to cratering and sagging.

6 Claims, No Drawings

AQUEOUS COATING OF CARBOXYL ACRYLIC RESIN-EPOXY RESIN PRODUCT

The present invention relates to a novel aqueous coating composition and a process for preparing the same, and more particularly to an aqueous coating composition suitable for coating the inner surface of cans which require fabrication property, corrosion resistance, water resistance, flavor-retaining ability, etc., the composition being capable of attaining remarkable uniformity of film thickness even in the case of a thin film and being outstanding in resistance to cratering and sagging. The invention also concerns with a process for preparing said aqueous coating composition.

In recent years, aqueous coating compositions have been extensively used for coating the inner surface of cans from the viewpoints of hygienic work conditions, preservation of environment and safety from fire. For example, Japanese Examined Patent Publications Nos. 41,934/1988 and 37,026/1984, Japanese Unexamined Patent Publication No.329,974/1994, etc. disclose these coating compositions for coating the interior of cans, more specifically aqueous coating compositions containing as a resin component an esterification reaction product of an epoxy resin with a carboxyl-containing acrylic resin.

These conventional aqueous coating compositions raise problems although excellent in properties for internally coating cans. When an esterification reaction product of an epoxy resin with a carboxyl-containing acrylic resin has a high acid value, the composition shows high surface tension and exhibits poor wetting on a substrate when applied to the substrate, displaying poor uniformity of film thickness (poor coatability). On the other hand, when the esterification reaction product has a low acid value, the composition is unsatisfactory in structural viscosity and is likely to cause sagging on application to a substrate and tends to induce cratering during baking, consequently exhibiting poor coatability.

It is a primary object of this invention to provide an aqueous coating composition capable of forming a coating film which is excellent in fabrication property, corrosion resistance, water resistance, flavor-retaining ability and so on, the composition being capable of attaining remarkable uniformity of film thickness even in the case of a thin film and being outstanding in resistance to cratering and sagging, and a process for preparing said aqueous coating composition.

The present inventors conducted extensive research to overcome the foregoing drawbacks of the prior art technologies and found the following. The intended aqueous coating composition comprises an esterification reaction product neutralized and dispersed in an aqueous medium. The esterification reaction product is produced by the reaction of an epoxy resin with a carboxyl-containing acrylic resin. If a carboxyl-containing acrylic resin as described below is used in said reaction, the desired aqueous coating composition is obtained. The required acrylic resin is such that the acid value of the resin at a higher molecular weight region with respect to its weight average molecular weight is higher by at least 80 mg KOH/g than at a lower molecular weight region. The obtained aqueous coating composition can attain remarkable uniformity of film thickness even when applied by spray coating, and can accomplish the above-mentioned object while the use of the resin does not adversely affect the fabrication property, corrosion resistance, water resistance and flavor-retaining ability of the coating film. The aqueous coating composition can be prepared using the acrylic resin formed by specific stepwise polymerization. The present invention was completed based on these novel findings.

According to the present invention, there is provided an aqueous coating composition comprising a carboxyl-containing reaction product neutralized and dispersed in an aqueous medium, the reaction product being produced by the esterification reaction of a carboxyl-containing acrylic resin (A) and an epoxy resin (B), the resin (A) comprising a carboxyl-containing polymerizable unsaturated monomer (a) and another polymerizable unsaturated monomer (b) as a monomer component, the acid value of the carboxyl-containing acrylic resin (A) at a higher molecular weight region with respect to its weight average molecular weight being higher by at least 80 mg KOH/g than at a lower molecular weight region.

According to the present invention, there is also provided a process for preparing an aqueous coating composition comprising a carboxyl-containing reaction product neutralized and dispersed in an aqueous medium, the reaction product being produced by the esterification reaction of a carboxyl-containing acrylic resin (A) and an epoxy resin (B), the acrylic resin (A) comprising a carboxyl-containing polymerizable unsaturated monomer (a) and another polymerizable unsaturated monomer (b) as a monomer component, the process comprising the steps of dividing the monomer component of the acrylic resin (A) into at least two monomer portions, and successively adding the monomer portions, starting from a second monomer portion, in the presence of a first monomer portion to conduct stepwise polymerization for producing the acrylic resin (A), the amount of the carboxyl-containing polymerizable unsaturated monomer (a) in the monomer portion to be finally added being less than the combined amount of the monomer (a) in the monomer portions already added prior to the final stage, so that the acid value of the acrylic resin (A) at a higher molecular weight region with respect to its weight average molecular weight is higher by at least 80 mg KOH/g than at a lower molecular weight region.

The acrylic resin (A) for use in the invention is prepared by copolymerizing the carboxyl-containing polymerizable unsaturated monomer (a) and the other polymerizable unsaturated monomer (b).

Examples of the carboxyl-containing polymerizable unsaturated monomer (a) which can be used herein are acrylic acid, methacrylic acid, crotonic acid, itaconic acid, maleic acid, fumaric acid, etc. These acid monomers can be used either alone or in mixture. Among them, methacrylic acid is desirable to use as the monomer (a) for coating the inner surface of cans in the present invention.

The other polymerizable unsaturated monomer (b) is copolymerizable with the monomer (a) and other than the monomer (a).

Examples of the monomer (b) are aromatic vinyl monomers such as styrene, vinyltoluene, 2-methylstyrene, t-butylstyrene and chlorostyrene; $C_{1-18}$ alkyl esters or cycloalkyl esters of acrylic or methacrylic acids such as methyl acrylate, ethyl acrylate, n-propyl acrylate, isopropyl acrylate, n-, i- or t-butyl acrylate, hexyl acrylate, 2-ethylhexyl acrylate, n-octyl acrylate, decyl acrylate, lauryl acrylate, cyclohexyl acrylate, methyl methacrylate, ethyl methacrylate, n-propyl methacrylate, isopropyl methacrylate, n-, i- or t-butyl methacrylate, hexyl methacrylate, 2-ethylhexyl methacrylate, octyl methacrylate, decyl methacrylate, lauryl methacrylate and cyclohexyl methacrylate; $C_{2-8}$ hydroxyalkyl esters of acrylic or methacrylic acids such as 2-hydroxyethyl acrylate, 2-hydroxypropyl acrylate, 3-hydroxypropyl acrylate, hydroxybutyl acrylate, 2-hydroxyethyl methacrylate, 2-hydroxypropyl methacrylate, 3-hydroxypropyl methacrylate and hydroxybutyl methacrylate; and N-substituted acrylamide monomers and N-substituted methacrylamide monomers such as N-methylolacrylamide, N-butoxymethylacrylamide, N-methylolmethacrylamide and N-butoxymethylmethacrylamide. These monomers can be used either alone or in combination. Among them, a mixture of styrene and ethyl acrylate is preferred as the monomer (b) for internally coating a can. A suitable weight ratio of the styrene-ethyl acrylate mixture is in the range of 99.9/0.1–40/60, preferably 99/1–50/50.

The carboxyl-containing acrylic resin (A) is not specifically limited in the ratio of constituent monomer and the kind of constituent monomer but usually comprises 30 to 80% by weight, preferably 40 to 65% by weight, of the carboxyl-containing polymerizable unsaturated monomer (a) and 70 to 20% by weight, preferably 60 to 35% by weight, of the other polymerizable unsaturated monomer (b).

It is essential in the invention that the carboxyl-containing acrylic resin (A) have such a relationship between the molecular weight distribution and the acid value distribution that the acid value of the resin (A) at a higher molecular weight region with respect to its weight average molecular weight is higher by at least 80 mg KOH/g than at a lower molecular weight region. If the difference in the acid value is less than 80 mg KOH/g between a higher molecular weight region and a lower molecular weight region, the uniformity of film thickness is unsatisfactory. A preferred difference of the acid value is greater than 100 to 300 mg KOH/g.

It is desirable in the invention that the carboxyl-containing acrylic resin (A) have an acid value of about 200 to about 520 mg KOH/g.

The carboxyl-containing acrylic resin (A) can be suitably prepared by specific stepwise polymerization. In the polymerization, the divided portions of monomer component (monomer portions) of the acrylic resin (A) are added, starting from a second monomer portion, in the presence of a first monomer portion, and the amount of the carboxyl-containing polymerizable unsaturated monomer (a) in the monomer portion to be finally added is less than the combined amount of the monomer (a) in the monomer portions already added prior to the final stage. In this case, preferably the amount of the carboxyl-containing polymerizable unsaturated monomer (a) in the monomer portion to be finally added is less than 50% of the combined amount of the monomer (a) in the monomer portions already added prior to the final stage. More preferably the monomer portion to be finally added is free of the monomer (a).

Stated more specifically, the monomer component of the acrylic resin (A) is so divided into at least two monomer portions that the amount of the monomer (a) in the monomer portion to be finally added is less than the combined amount of the monomer (a) in the monomer portions already added prior to the final stage. The first monomer portion is charged into a reactor in the first place and after heating to a polymerization temperature, the other portions are stepwise added in the presence of the first monomer portion, starting from the second portion. For avoiding the production of low-molecular-weight substances and for facilitating the control of polymerization temperature, the amount of the first monomer portion to be charged first into a reactor is preferably about 10 to about 50% by weight, more preferably about 20 to about 30% by weight, of the total monomer component.

The number of divided monomer portions is not specifically limited insofar as it is two or more. However, when the number of divided monomer portions is two, it may become difficult to control the polymerization temperature due to heat given off during the polymerization of the monomer (a). On the other hand, when the number of divided monomer portions is 5 or more, the effect of division into so many portions is very low and the stepwise addition is cumbersome. Thus, a preferred number of divided monomer portions is 3 or 4. The quantitative relationship of the divided monomer portions to be added stepwise is such that the minimum amount/maximum amount is preferably approximately 1/50–1/1, more preferably approximately 1/20–1/1.

When the monomer component is divided into at least 3 monomer portions, the monomer (a) may be absent or present in any of the first monomer portion and the last monomer portion. In this case, the amount of the monomer (a) in the third monomer portion is less than the amount of the monomer (a) in the first and second monomer portions or is nothing. If further divided monomer portions to be added are present, each amount of the monomer (a) in the residual monomer portions is less than the amount of the monomer (a) in the third monomer portion or is nothing. Preferably the amount of the monomer (a) later added in the order of addition is less than that of the monomer (a) earlier added or is zero.

The third monomer portion may be added immediately after the addition of the second monomer portion or with a specific lapse of time thereafter. If a 4th monomer portion exists, the 4th monomer portion may be added immediately after the addition of the third monomer portion or with a specific lapse of time thereafter. If a further monomer portion is added, it may be added in the same manner as above. Preferably the monomer portions are gradually added to a reaction system over a specific period of time by dropwise addition method or the like.

A more suitable process for preparing the carboxyl-containing acrylic resin (A) comprises dividing the monomer component of the resin (A) into 3 or 4 portions, heating the first monomer portion to a reaction temperature and subsequently adding the other monomer portions starting from the second monomer portion to accomplish stepwise polymerization, wherein the amount of the first monomer portion is 10 to 50% by weight of the amount of the total monomer component and wherein in the case of three divided monomer portions, the amount of the monomer (a) in the third monomer portion is less than the combined amount of the monomer (a) in the first and second monomer portions or is nothing, and in the case of 4 divided monomer portions, the amount of the monomer (a) in the 4th monomer portion is less than the amount of the monomer (a) in the third monomer portion or is nothing.

The acrylic resin (A) can be also prepared by heating a polymerization system to a polymerization temperature and stepwise adding the monomer portions starting from the first monomer portion to perform polymerization. But this process poses a problem of being likely to produce a low-molecular-weight substance from the first monomer portion. Thus, if the process comprises charging the first monomer portion into a reactor in the first place, heating the first monomer portion to a polymerization temperature and subsequently adding the other monomer portion(s) starting from the second monomer portion, such problem can be avoided. Therefore, the latter process is preferred.

The polymerization reaction for preparing the carboxyl-containing acrylic resin (A) can be carried out by conventional processes, for example, in an organic solvent in the presence of a radical polymerization initiator such as azobisisobutyronitrile, benzoyl peroxide, t-butyl perbenzoyl octanoate and t-butyl peroxy-2-ethyl hexanoate. While the conditions of reaction temperature and reaction time are not specifically limited, the reaction is carried out at about 80° to about 150° C. for about 1 to about 20 hours.

The obtained carboxyl-containing acrylic resin (A) has a weight average molecular weight (based an polystyrene) of about 8,000 to about 80,000, preferably about 10,000 to about 40,000.

The epoxy resin (B) to be esterified together with the carboxyl-containing acrylic resin (A) is preferably a bisphenol epoxy resin having a number average molecular weight of 2,000 to 10,000, and an epoxy equivalent of 2,500 to 5,000. Examples of commercially available products are "EPIKOTE 1007", "EPIKOTE 1009" and "EPIKOTE 1010" (trade names, products of Yuka Shell Epoxy Co., Ltd.); "ARALDITE AER 6099" (trade name, product of Asahi-Ciba Co., Ltd.); and "EPOMIC R-309" (trade name, product of Mitsui Petrochemical Industries, Ltd.).

The carboxyl-containing reaction product can be produced by the esterification reaction of the carboxyl-containing acrylic resin (A) with the epoxy resin (B). The reaction is conducted by heating at about 80° to about 120° C. for about 0.5 to about 8 hours in an organic solvent in the presence of an esterification catalyst such as triethylamine, dimethylethanolamine or like tertiary amines, or triphenylphosphine or like quaternary salt compounds.

While the proportions of the carboxyl-containing acrylic resin (A) and the epoxy resin (B) to be used in the reaction are suitably selected depending on the coating efficiency and the film properties, the two components are used in a solid weight ratio of 10/90–40/60, preferably 20/80–30/70.

The carboxyl-containing reaction products obtained by said esterification reaction include, for example, those comprising a carboxyl-containing acrylic resin and an epoxy resin linked together by an ester linkage, those comprising these resins linked together by a quaternary salt linkage, acrylic resin-modified epoxy resins having an unreacted epoxy group and acrylic resins having an unreacted carboxyl group. It is preferred in view of dispersion stability in an aqueous medium and water resistance of the coating film that the carboxyl-containing reaction product have an acid value of about 30 to about 120 mg KOH/g. In view of coating efficiency and storage stability of the composition, preferably the carboxyl-containing reaction product has a residual epoxy group ratio of 0 to 40%.

The carboxyl-containing reaction product is neutralized and dispersed in an aqueous medium according to the invention. Amines and ammonia are suitable as a neutralizing agent in the neutralization. Typical examples of amines are alkylamines such as trimethylamine, triethylamine and tributylamine; alkanolamines such as dimethylethanolamine, diethanolamine and aminomethylpropanol; and cyclic amines such as morpholine, etc. The neutralization degree of the carboxyl-containing reaction product is not specifically limited but is preferably in the range of 0.1 to 2.0 equivalents.

The aqueous medium to be used in the reaction may be water or a mixture of water and an organic solvent. Useful organic solvents can be any of conventional organic solvents which are miscible with water and which do not adversely affect the stability of the carboxyl-containing reaction product in an aqueous medium. Preferred as the organic solvent are alcohols, Cellosolves and Carbitol solvents. Specific examples of organic solvents which can be used in the invention are isopropanol, butyl alcohol, 2-hydroxy-4-methylpentane, 2-ethylhexyl alcohol, cyclcohexanol, ethylene glycol, diethylene glycol, 1,3-butylene glycol, ethylene glycol monoethyl ether, ethylene glycol monobutyl ether, diethylene glycol monomethyl ether, acetone, etc. Useful organic solvents include inert water-immiscible organic solvents other than said examples which solvents do not adversely affect the stability of the carboxyl-containing reaction product in an aqueous medium. Examples of such organic solvents are aromatic hydrocarbons such as toluene and xylene, esters such as ethyl acetate and butyl acetate, ketones such as methyl ethyl ketone, etc. A preferred amount of the organic solvent in the aqueous coating composition of the present invention is up to 20% by weight in view of the preservation of environment.

The carboxyl-containing reaction product can be neutralized and dispersed in an aqueous medium by conventional methods. For example, the carboxyl-containing reaction product may be gradually added with stirring to an aqueous medium containing a neutralizing agent. Optionally after the carboxyl-containing reaction product is neutralized with an neutralizing agent, an aqueous medium may be added to the neutralization product with stirring, or the neutralization product may be added to an aqueous medium with stirring.

The aqueous coating composition of the invention may comprise only an aqueous resin composition consisting of a carboxyl-containing reaction product neutralized and dispersed in an aqueous medium or when required, may contain a crosslinking agent such as resol-type phenolic resins, melamine resins or benzoguanamine resins, surfactants, waxes, defoaming agents, pigments and the like, for example, to improve the coating properties and applicability and to prevent scratching on a coating film during fabrication, transport of articles, etc.

The aqueous coating composition of the invention can be applied to various substrates such as aluminum panels, steel panels, tinplates or like untreated or surface-treated metallic plates, and metallic plates coated with a epoxy-based, vinyl-based or other primer, and also can be applied to cans made of these metallic plates.

The aqueous coating composition of the invention can be applied to substrates by conventional coating methods including roll coating, spray coating, dipping and electrodeposition among which spray coating is preferable. The thickness of the coating film is suitably selected depending on the purpose, but is usually in the range of about 3 to about 20 μm. The applied coating is baked at 150° to 300° C. for 15 seconds to 30 minutes, preferably at 200° to 220° C. for 30 seconds to 90 seconds.

Preparation Examples, Examples and Comparative Examples are given below to clarify the invention in more detail. The parts and percentages in these examples are all by weight.

PREPARATION EXAMPLE 1

(Preparation of Epoxy Resin Solution)

A reactor was charged with 880 parts of "EPIKOTE 828 EL" (trade name, product of Yuka Shell Epoxy Co., Ltd., epoxy resin, epoxy equivalent about 190), 492 parts of bisphenol A, 1.23 parts of tetraethylammonium bromide and 152 parts of methyl isobutyl ketone. The contents were heated to 140° C. in a nitrogen stream to undergo a reaction for about 4 hours, giving an epoxy resin solution having a solids content of 90% (solution B). The epoxy resin thus obtained had a number average molecular weight of 4,700, and an epoxy equivalent of 3,700. The solution B diluted with diethylene glycol monobutyl ether to a solids content of 40% had a Gardner viscosity of $Z_6$.

PREPARATION EXAMPLE 2

(Preparation of Carboxyl-containing Acrylic Resin Solution)

| (1)  | n-Butanol                     | 1365 parts |
|------|-------------------------------|------------|
| (2)  | Methacrylic acid              | 91 parts   |
| (3)  | Styrene                       | 96 parts   |
| (4)  | Ethyl acrylate                | 113 parts  |
| (5)  | t-Butyl peroxy-2-ethyl hexanoate | 10.5 parts |
| (6)  | Methacrylic acid              | 584 parts  |
| (7)  | Styrene                       | 466 parts  |
| (8)  | t-Butyl peroxy-2-ethyl hexanoate | 36.8 parts |
| (9)  | Styrene                       | 150 parts  |
| (10) | t-Butyl peroxy-2-ethyl hexanoate | 5.3 parts  |

A 4-necked flask was charged with the above-mentioned components (1) to (5), which were then heated to 93° C. A mixture of components (6) to (8) was added dropwise over a period of 160 minutes at a constant rate. After dropwise addition, a mixture of components (9) and (10) was added dropwise over a period of 20 minutes at a constant rate. The mixture was heated to 100° C. after dropwise addition, and maintained at the same temperature for 1 hour. A mixture of 7.5 parts of t-butyl peroxy-2-ethyl hexanoate and 45 parts of n-butanol was added dropwise over 30 minutes at a constant rate. Then the resulting mixture was maintained for 2 hours for aging. After cooling, the mixture was admixed with 1430 parts of n-butanol and 600 parts of ethylene glycol monobutyl ether, giving a carboxyl-containing acrylic resin solution having a solids content of 30% (solution A-1).

The proportion of the carboxyl-containing unsaturated monomer (a) in the first monomer portion of components (2) to (4) is 91/300, the proportion of the carboxyl-containing unsaturated monomer (a) in the second monomer portion of components (6) and (7) is 584/1050, and the proportion of the carboxyl-containing unsaturated monomer (a) in the third monomer portion of component (9) is 0/150.

The obtained resin had an acid value of 293 mg KOH/g, and a weight average molecular weight of about 30,000.

The molecular weights of the resin as determined by gel permeation chromatography (GPC) were divided into a higher molecular weight region and a lower molecular weight region with respect to its weight average molecular weight. The acid values of the resin were measured at the respective molecular weight regions. The resin had an acid value of 362 mg KOH/g at a higher molecular weight region (higher than its weight average molecular weight of 30,000) and an acid value of 230 mg KOH/g at a lower molecular weight region (lower than its weight average molecular weight of 30,000).

PREPARATION EXAMPLE 3

(Preparation of Carboxyl-containing Acrylic Resin Solution)

| (1)  | Ethylene glycol monobutyl ether | 541.5 parts |
|------|-------------------------------|-------------|
| (2)  | Methacrylic acid              | 57.4 parts  |
| (3)  | Styrene                       | 17.6 parts  |
| (4)  | Ethyl acrylate                | 25 parts    |
| (5)  | t-Butyl peroxy-2-ethyl hexanoate | 6 parts     |
| (6)  | Methacrylic acid              | 267.6 parts |
| (7)  | Styrene                       | 82.4 parts  |
| (8)  | t-Butyl peroxy-2-ethyl hexanoate | 21 parts    |
| (9)  | Styrene                       | 50 parts    |
| (10) | t-Butyl peroxy-2-ethyl hexanoate | 3 parts     |

A 4-necked flask was charged with the above-mentioned components (1) to (5), which were heated to 93° C. Then, a mixture of components (6) to (8) was added dropwise over a period of 160 minutes at a constant rate. After dropwise addition, a mixture of components (9) and (10) was added dropwise over a period of 20 minutes at a constant rate. The mixture was heated to 100° C. after dropwise addition, and aged while being maintained at the same temperature for 1 hour. After cooling, 595.2 parts of ethylene glycol monobutyl ether was added, giving a carboxyl-containing acrylic resin solution having a solids content of 30% (solution A-2).

The proportion of the carboxyl-containing unsaturated monomer (a) in the first monomer portion of components (2) to (4) is 57.4/100, the proportion of the carboxyl-containing unsaturated monomer (a) in the second monomer portion of components (6) and (7) is 267.6/350, and the proportion of the carboxyl-containing unsaturated monomer (a) in the third monomer portion of component (9) is 0/50.

The obtained resin had an acid value of 425 mg KOH/g, and a weight average molecular weight of about 10,000.

The molecular weights of the resin as determined by gel permeation chromatography (GPC) were divided into a higher molecular weight region and a lower molecular weight region with respect to its weight average molecular weight. The acid values of the resin were measured at the respective molecular weight regions. The resin had an acid value of 477 mg KOH/g at a higher molecular weight region (higher than its weight average molecular weight of 10,000) and an acid value of 341 mg KOH/g at a lower molecular weight region (lower than its weight average molecular weight of 10,000).

PREPARATION EXAMPLE 4

(Preparation of Carboxyl-containing Acrylic Resin Solution)

| (1)  | Ethylene glycol monobutyl ether | 680 parts  |
|------|-------------------------------|------------|
| (2)  | Methacrylic acid              | 50 parts   |
| (3)  | Styrene                       | 25 parts   |
| (4)  | Ethyl acrylate                | 25 parts   |
| (5)  | t-Butyl peroxy-2-ethyl hexanoate | 6 parts    |
| (6)  | Methacrylic acid              | 225 parts  |
| (7)  | Styrene                       | 75 parts   |
| (8)  | t-Butyl peroxy-2-ethyl hexanoate | 18 parts   |
| (9)  | Methacrylic acid              | 50 parts   |
| (10) | Styrene                       | 25 parts   |
| (11) | t-Butyl peroxy-2-ethyl hexanoate | 4.5 parts  |
| (12) | Styrene                       | 25 parts   |
| (13) | t-Butyl peroxy-2-ethyl hexanoate | 1.5 parts  |

A 4-necked flask was charged with the above-mentioned components (1) to (5), which were heated to 93° C. Then, a mixture of components (6) to (8) was added dropwise over a period of 135 minutes at a constant rate. After dropwise addition, a mixture of components (9) to (11) was added dropwise over a period of 35 minutes at a constant rate. After dropwise addition, a mixture of components (12) and (13) was added dropwise over a period of 20 minutes at a constant rate. The mixture was heated to 100° C. after dropwise addition, and was aged while being maintained at the same temperature for 1 hour. After cooling, 456.7 parts of ethylene glycol monobutyl ether was added, giving a carboxyl-containing acrylic resin solution having a solids content of 30% (solution A-3).

The proportion of the carboxyl-containing unsaturated monomer (a) in the first monomer portion of components (2) to (4) is 50/100, the proportion of the carboxyl-containing unsaturated monomer (a) in the second monomer portion of components (6) and (7) is 225/300, and the proportion of the carboxyl-containing unsaturated monomer (a) in the third monomer portion of components (9) and (10) is 50/75 and the proportion of the carboxyl-containing unsaturated monomer (a) in the 4th monomer portion of component (12) is 0/25.

The obtained resin had an acid value of 425 mg KOH/g, and a weight average molecular weight of about 10,000.

The molecular weights of the resin as determined by gel permeation chromatography (GPC) were divided into a higher molecular weight region and a lower molecular weight region with respect to its weight average molecular weight. The acid values of the resin were measured at the respective molecular weight regions. The resin had an acid value of 493 mg KOH/g at a higher molecular weight region (higher than its weight average molecular weight of 10,000) and an acid value of 328 mg KOH/g at a lower molecular weight region (lower than its weight average molecular weight of 10,000).

PREPARATION EXAMPLE 5

(Preparation of Carboxyl-containing Acrylic Resin Solution for Comparison)

| (1) | n-Butanol | 1365 parts |
| (2) | Methacrylic acid | 675 parts |
| (3) | Styrene | 712 parts |
| (4) | Ethyl acrylate | 113 parts |
| (5) | t-Butyl peroxy-2-ethyl hexanoate | 52.5 parts |

A 4-necked flask was charged with the above-mentioned component (1), and the component was heated to 93° C. Then, a mixture of components (2) to (5) was added dropwise over a period of 180 minutes at a constant rate. After dropwise addition, the mixture was heated to 100° C., and maintained at the same temperature for 1 hour. A mixture of 7.5 parts of t-butyl peroxy-2-ethyl hexanoate and 45 parts of n-butanol was added dropwise over 30 minutes at a constant rate and the resulting mixture was maintained for 2 hours for aging. After completion of the reaction, 1430 parts of n-butanol and 600 parts of ethylene glycol monobutyl ether was added, giving a carboxyl-containing acrylic resin solution having a solids content of 30% (solution A-4) for comparative purpose.

The proportion of the carboxyl-containing unsaturated monomer (a) in the monomer portion of components (2) to (4) is 675/1500.

The obtained resin had an acid value of 293 mg KOH/g, and a weight average molecular weight of about 30,000.

The molecular weights of the resin as determined by gel permeation chromatography (GPC) were divided into a higher molecular weight region and a lower molecular weight region with respect to its weight average molecular weight. The acid values of the resin were measured at the respective molecular weight regions. The resin had an acid value of 298 mg KOH/g at a higher molecular weight region (higher than its weight average molecular weight of 30,000) and an acid value of 285 mg KOH/g at a lower molecular weight region (lower than its weight average molecular weight of 30,000).

PREPARATION EXAMPLE 6

(Preparation of Carboxyl-containing Acrylic Resin Solution for Comparison)

| (1) | n-Butanol | 1365 parts |
| (2) | Methacrylic acid | 91 parts |
| (3) | Styrene | 96 parts |
| (4) | Ethyl acrylate | 113 parts |
| (5) | t-Butyl peroxy-2-ethyl hexanoate | 10.5 parts |
| (6) | Methacrylic acid | 584 parts |
| (7) | Styrene | 616 parts |
| (8) | t-Butyl peroxy-2-ethyl hexanoate | 42.1 parts |

A 4-necked flask was charged with the above-mentioned components (1) to (5), which were heated to 93° C. Then, a mixture of components (6) to (8) was added dropwise over a period of 180 minutes at a constant rate. After dropwise addition, the mixture was heated to 100° C., and maintained at the same temperature for 1 hour. A mixture of 7.5 parts of t-butyl peroxy-2-ethyl hexanoate and 45 parts of n-butanol was added dropwise over 30 minutes at a constant rate. The resulting mixture was maintained for 2 hours for aging. After cooling, 1430 parts of n-butanol and 600 parts of ethylene glycol monobutyl ether was added, giving a carboxyl-containing acrylic resin solution having a solids content of 30% (solution A-5) for comparative purpose.

The proportion of the carboxyl-containing unsaturated monomer (a) in the first monomer portion of components (2) to (4) is 91/300, and the proportion of the carboxyl-containing unsaturated monomer (a) in the second monomer portion of components (6) and (7) is 584/1200.

The obtained resin had an acid value of 293 mg KOH/g, and a weight average molecular weight of about 30,000.

The molecular weights of the resin as determined by gel permeation chromatography (GPC) were divided into a higher molecular weight region and a lower molecular weight region with respect to its weight average molecular weight. The acid values of the resin were measured at the respective molecular weight regions. The resin had an acid value of 317 mg KOH/g at a higher molecular weight region (higher than its weight average molecular weight of 30,000) and an acid value of 272 mg KOH/g at a lower molecular weight region (lower than its weight average molecular weight of 30,000).

PREPARATION EXAMPLE 7

(Preparation of Carboxyl-containing Acrylic Resin Solution for Comparison)

| (1) | Ethylene glycol monobutyl ether | 541.5 parts |
| (2) | Methacrylic acid | 325 parts |
| (3) | Styrene | 150 parts |
| (4) | Ethyl acrylate | 25 parts |
| (5) | t-Butyl peroxy-2-ethyl hexanoate | 30 parts |

A 4-necked flask was charged with the above-mentioned component (1), and the component was heated to 93° C. Then, a mixture of components (2) to (5) was added dropwise over a period of 180 minutes at a constant rate. After dropwise addition, the mixture was heated to 100° C., and aged while being maintained at the same temperature for 1 hour. After cooling, 595.2 parts of ethylene glycol monobutyl ether was added, giving a carboxyl-containing acrylic resin solution having a solids content of 30% (solution A-6) for comparative purpose.

The proportion of the carboxyl-containing unsaturated monomer (a) in the monomer portion of components (2) to (4) is 325/500.

The obtained resin had an acid value of 425 mg KOH/g, and a weight average molecular weight of about 10,000.

The molecular weights of the resin as determined by gel permeation chromatography (GPC) were divided into a higher molecular weight region and a lower molecular weight region with respect to its weight average molecular weight. The acid values of the resin were measured at the respective molecular weight regions. The resin had an acid value of 432 mg KOH/g at a higher molecular weight region (higher than its weight average molecular weight of 10,000) and an acid value of 393 mg KOH/g at a lower molecular weight region (lower than its weight average molecular weight of 10,000).

PREPARATION EXAMPLE 8

(Preparation of Aqueous Resin Dispersion of Carboxyl-containing Reaction Product)

| | |
|---|---|
| (1) Epoxy resin solution B (solids content 40%) prepared in Preparation Example 1 | 89 parts |
| (2) Acrylic resin solution A-1 (solids content 30%) prepared in Preparation Example 2 | 67 parts |
| (3) Deionized water | 3.6 parts |
| (4) Dimethylethanolamine (esterification catalyst) | 4 parts |
| (5) Dimethylethanolamine (neutralizing agent) | 1 part |
| (6) Deionized water | 235.4 parts |

The above-mentioned components (1) and (2) were charged into a reactor, which were heated to 80° C. to obtain a homogeneous solution. Then the component (3) was added at the same temperature. After 30 minutes, the component (4) was added and the mixture was stirred for 20 minutes. Thereafter a mixture of components (5) and (6) was added over a period of 1 hour, giving an aqueous resin dispersion having a solids content of 25% (dispersion C-1).

The carboxyl-containing reaction product in the dispersion C-1 had a residual epoxy group ratio of 0% and an acid value of 46 mg KOH/g.

PREPARATION EXAMPLE 9

(Preparation of Aqueous Resin Dispersion of Carboxyl-containing Reaction Product)

The same procedure as in Preparation Example 8 was repeated with the exception of using the following components, giving an aqueous resin dispersion having a solids content of 25% (dispersion C-2).

| | |
|---|---|
| (1) "ARALDITE AER-6099" (trade name, product of Asahi-Ciba Co., Ltd., epoxy resin having a solids content of 100%) | 70 parts |
| (2) Acrylic resin solution A-2 (solids content 30%) prepared in Preparation Example 3 | 100 parts |
| (3) Deionized water | 5 parts |
| (4) Dimethylethanolamine (esterification catalyst) | 4 parts |
| (5) Dimethylethanolamine (neutralizing agent) | 1 part |
| (6) Deionized water | 220 parts |

The carboxyl-containing reaction product in the dispersion C-2 had a residual epoxy group ratio of 0% and an acid value of 113 mg KOH/g.

PREPARATION EXAMPLE 10

(Preparation of Aqueous Resin Dispersion of Carboxyl-containing Reaction Product)

The same procedure as in Preparation Example 8 was repeated with the exception of using the following components, giving an aqueous resin dispersion having a solids content of 25% (dispersion C-3).

| | |
|---|---|
| (1) "ARALDITE AER-6099" (trade name, product of Asahi-Ciba Co., Ltd., epoxy resin having a solids content of 100%) | 70 parts |
| (2) Acrylic resin solution A-3 (solids content 30%) prepared in Preparation Example 4 | 100 parts |
| (3) Deionized water | 5 parts |
| (4) Dimethylethanolamine (esterification catalyst) | 4 parts |
| (5) Dimethylethanolamine (neutralizing agent) | 1 part |
| (6) Deionized water | 220 parts |

The carboxyl-containing reaction product in the dispersion C-3 had a ratio of residual epoxy group of 0% and an acid value of 113 mg KOH/g.

PREPARATION EXAMPLE 11

(Preparation of Aqueous Resin Dispersion of Carboxyl-containing Reaction Product for Comparison)

The same procedure as in Preparation Example 8 was repeated with the exception of using the acrylic resin solution A-4 having a solids content of 30% and prepared in Preparation Example 5 in place of the acrylic resin solution A-1, giving an aqueous resin dispersion having a solids content of 25% (dispersion C-4) for comparative purpose.

The carboxyl-containing reaction product in the dispersion C-4 had a residual epoxy group ratio of 0% and an acid value of 46 mg KOH/g.

PREPARATION EXAMPLE 12

(Preparation of Aqueous Resin Dispersion of Carboxyl-containing Reaction Product for Comparison)

The same procedure as in Preparation Example 8 was repeated with the exception of using the acrylic resin solution A-5 having a solids content of 30% and prepared in Preparation Example 6 in place of the acrylic resin solution A-1, giving an aqueous resin dispersion having a solids content of 25% (dispersion C-5) for comparative purpose.

The carboxyl-containing reaction product in the dispersion C-5 had a residual epoxy group ratio of 0% and an acid value of 46 mg KOH/g.

PREPARATION EXAMPLE 13

(Preparation of Aqueous Resin Dispersion of Carboxyl-containing Reaction Product for Comparison)

The same procedure as in Preparation Example 9 was repeated with the exception of using the acrylic resin solution A-6 having a solids content of 30% and prepared in Preparation Example 7 in place of the acrylic resin solution A-2, giving an aqueous resin dispersion having a solids content of 25% (dispersion C-6) for comparative purpose.

The carboxyl-containing reaction product in the dispersion C-6 had a residual epoxy group ratio of 0% and an acid value of 113 mg KOH/g.

EXAMPLE 1

| | |
|---|---|
| (1) Aqueous resin dispersion C-1 prepared in Preparation Example 8 | 40 parts |
| (2) Resol-type phenolic resin ("CKS-390", trade name, product of Showa Kobunshi Kabushiki Kaisha) | 1 part |
| (3) Wax ("MICHEMLUBE 160F", product of Michelman Inc.) | 0.5 part |
| (4) Deionized water | 13.6 parts |

A reactor was charged with the above-mentioned components (1) to (4) and the components were stirred for 30 minutes, giving an aqueous coating composition according to the present invention.

EXAMPLE 2

The procedure of Example 1 was repeated with the exception of using the aqueous resin dispersion C-2 prepared in Preparation Example 9 in place of the aqueous resin dispersion C-1, giving an aqueous coating composition according to the invention.

EXAMPLE 3

The procedure of Example 1 was repeated with the exception of using the aqueous resin dispersion C-3 prepared in Preparation Example 10 in place of the aqueous resin dispersion C-1, giving an aqueous coating composition according to the invention.

COMPARATIVE EXAMPLE 1

The procedure of Example 1 was repeated with the exception of using the aqueous resin dispersion C-4 prepared in Preparation Example 11 in place of the aqueous resin dispersion C-1, giving a comparative aqueous coating composition.

COMPARATIVE EXAMPLE 2

The procedure of Example 1 was repeated with the exception of using the aqueous resin dispersion C-5 prepared in Preparation Example 12 in place of the aqueous resin dispersion C-1, giving a comparative aqueous coating composition.

COMPARATIVE EXAMPLE 3

The procedure of Example 1 was repeated with the exception of using the aqueous resin dispersion C-6 prepared in Preparation Example 13 in place of the aqueous resin dispersion C-1, giving a comparative aqueous coating composition.

The aqueous coating compositions prepared in the Examples and Comparative Examples were tested for performance as described below.

Each coating composition (test sample) was applied by spray coating to the inner surface of a 0.3 mm-thick DI can of aluminum having a capacity of 350 ml in an amount (solid basis) of about 90 to about 100 mg (dry thickness of about 4 μm) per one can, and was baked at 200° C. for 60 seconds to provide an internally coated can. The coated cans were checked for the uniformity of film thickness (coatability), fabrication property against impact, resistance to retorting and flavor-retaining ability. Internally coated cans were produced in the same manner as above with the exception of spraying the interior of the can in an amount of about 150 to about 160 mg per one can (dry thickness of about 6 μm, calculated as solids) to give samples to be tested for the cratering (foaming) of cured coating.

Test methods are as follows.

Coatability (Thickness Uniformity)

An electrolyte was charged into an internally coated can and a carbon electrode was placed into the electrolyte. An electric current was passed between the electrode and the aluminum of the can exterior at 6.5 V for 6 seconds and then the required amount of electricity was measured to evaluate the degree of coatability on the internally coated surface of cans. Using 20 coated cans as samples to determine the amount of electricity (mA), a mean value was calculated to assess the results according to the following criteria.

A: Up to 1 mA means excellent coatability.
B: 1 mA to 5 mA means good coatability.
C: 5 mA to 50 mA means poor coatability.
D: Over 50 mA means markedly poor coatability.

Fabrication Property Against Impact

The coated can was cut open and the can main body was bent double lengthwise with the coated surface outwardly directed to provide test pieces. Using a folding type Du-Pont impact tester, 2 aluminum sheets 0.3 mm in thickness were inserted between the two ends of each folded test piece. A load having a flat contact surface and weighing 1 kg was dropped from a height of 50 cm onto the bent portion of each test piece to give impact. An electric current was passed through the bent portion of test piece at 6.5 V for 6 seconds to determine the amount of electricity in a 20 mm-wide bent portion of test piece. The ratings of A to C mean the following according to the amount of electricity.

A: Up to 5 mA (excellent fabrication property)
B: 5 to 15 mA (good fabrication property)
C: Over 15 mA (poor fabrication property)

Resistance to Retorting

The coated can was cut open and heated in tap water at 125° C. for 30 minutes to observe the appearance of coating surface. Cellophane adhesive tape was applied to the coated surface and quickly peeled off. Thereafter the surface was visually assessed as to the condition of coated surface according to the following criteria.

A: No change in appearance or no peel.
B: Slight blushing but no peel.
C: Peel was found.

Flavor-retaining Ability

Tap water (350 ml) treated with activated carbon was packed into the coated can. The can was hermetically sealed and treated for sterilization at 100° C. for 30 minutes. After storage at 20° C. for 6 months, the liquid in the can was tested for flavor-retaining ability and evaluated on the following ratings.

A: No change in flavor
B: Slight change in flavor
C: Some change in flavor
D: Marked change in flavor Resistance to Cratering The can was sprayed with the coating composition in an amount of about 150 to about 160 mg per can, and the coated can was baked. The degree of cratering (foaming) was visually evaluated and rated according to the following criteria.

A: No cratering.
B: Small craters sparsely occurred.
C: Small craters abundantly occurred.
D: Large craters abundantly occurred.

The test results are shown in Table 1.

TABLE 1

|  | Example | | | Comparative Example | | |
|---|---|---|---|---|---|---|
|  | 1 | 2 | 3 | 1 | 2 | 3 |
| Coatability | A | B | B | B | C | D |
| Fabrication property against impact | A | B | B | B | B | B |
| Resistance to retorting | A | A | A | A | A | A |
| Flavor-retaining ability | A | A | A | B | C | D |
| Resistance to cratering | B | A | A | D | C | C |

The aqueous coating composition of the invention comprises a carboxyl-containing reaction product neutralized and dispersed in an aqueous medium, the reaction product being produced by the esterification reaction of a carboxyl-containing acrylic resin and an epoxy resin, the acid value of the carboxyl-containing acrylic resin at a higher molecular weight region with respect to its weight average molecular weight in its molecular weight distribution being higher by at least 80 mg KOH/g than at a lower molecular weight region, wherein the coating composition is capable of attaining uniformity of film thickness even in the case of a thin film applied by spray coating, without sacrifice of fabrication property, corrosion resistance, water resistance, flavor-retaining ability, etc. and the composition is superior in resistance to cratering and sagging and is pronouncedly suitable, therefore, for coating the interior of cans. The coating composition of the invention is aqueous and therefore advantageous from the viewpoints of preservation of environment, safety and hygienic work conditions.

What is claimed is:

1. An aqueous coating composition comprising a carboxyl-containing reaction product neutralized and dispersed in an aqueous medium, the reaction product being produced by the esterification reaction of a carboxyl-containing acrylic resin (A) and an epoxy resin (B), the resin (A) comprising a carboxyl-containing polymerizable unsaturated monomer (a) and another polymerizable unsaturated monomer (b) as monomer components, the acid value of the carboxyl-containing acrylic resin (A) at a higher molecular weight region with respect to its weight average molecular weight being higher by at least 80 mg KOH/g than at a lower molecular weight region, the carboxyl-containing acrylic resin (A) being prepared by stepwise polymerization in which the monomer component of the acrylic resin (A) is divided into at least two monomer portions, and the monomer portion(s) other than a first monomer portion is added starting from a second monomer portion in the presence of the first monomer portion, the amount of the carboxyl-containing polymerizable unsaturated monomer (a) in the monomer portion to be finally added being less than the combined amount of the monomer (a) in the monomer portions already added prior to the final stage.

2. The aqueous coating composition according to claim 1 wherein the carboxyl-containing acrylic resin (A) is prepared by stepwise polymerization in which the monomer component of the resin (A) is divided into 3 or 4 monomer portions, a first monomer portion is heated to a reaction temperature and other monomer portions than the first monomer portion are successively added, wherein the amount of the first monomer portion is 10 to 50% by weight of the total monomer component, wherein when the monomer component of the resin (A) is divided into three monomer portions, the amount of the monomer (a) in the third monomer portion is less than the combined amount of the monomer (a) in the first and second monomer portions or is nothing; or when the monomer component of the resin (A) is divided into 4 monomer portions, the amount of the monomer (a) in the 4th monomer portion is less than the amount of the monomer (a) in the third monomer portion or is nothing.

3. The aqueous coating composition according to claim 1, wherein the carboxyl-containing acrylic resin (A) has an acid value of 200 to 520 mg KOH/g.

4. The aqueous coating composition according to claim 1, wherein the carboxyl-containing acrylic resin (A) comprises 30 to 80% by weight of the carboxyl-containing polymerizable unsaturated monomer (a) and 70 to 20% by weight of the other polymerizable unsaturated monomer (b).

5. The aqueous coating composition according to claim 4, wherein the carboxyl-containing polymerizable unsaturated monomer (a) is methacrylic acid and the other polymerizable unsaturated monomer (b) is a mixture of styrene and ethyl acrylate, the weight ratio of the styrene-ethyl acrylate mixture being in the range of 99.9/0.1–40/60.

6. The aqueous coating composition according to claim 1, wherein the epoxy resin (B) is a bisphenol epoxy resin having a number average molecular weight of 2,000 to 10,000, and an epoxy equivalent of 2,500 to 5,000.

* * * * *